United States Patent
Ma et al.

(10) Patent No.: US 12,277,589 B2
(45) Date of Patent: Apr. 15, 2025

(54) SYSTEM, METHOD, AND NON-TRANSITORY COMPUTER READABLE STORAGE MEDIUM, FOR DIVERSIFYING COMPLEMENTARY ITEM RECOMMENDATIONS BASED ON USER PREFERENCES

(71) Applicant: Walmart Apollo, LLC, Bentonville, AR (US)

(72) Inventors: Luyi Ma, Sunnyvale, CA (US); Nimesh Sinha, San Jose, CA (US); Hyun Duk Cho, San Francisco, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 189 days.

(21) Appl. No.: 17/163,380

(22) Filed: Jan. 30, 2021

(65) Prior Publication Data
US 2022/0245705 A1 Aug. 4, 2022

(51) Int. Cl.
G06Q 30/0601 (2023.01)
G06N 5/04 (2023.01)
G06N 20/00 (2019.01)

(52) U.S. Cl.
CPC ........... *G06Q 30/0631* (2013.01); *G06N 5/04* (2013.01); *G06N 20/00* (2019.01)

(58) Field of Classification Search
USPC ................................................ 705/26.1–27.2
See application file for complete search history.

(56) References Cited

U.S. PATENT DOCUMENTS 7,113,917 B2 9/2006 Jacobi et al.
8,737,728 B2 5/2014 Bhardwaj et al.
(Continued)

OTHER PUBLICATIONS

ATG recommendations enhanced to support new channels and greater merchant control. (May 11, 2009). Business Wire Retrieved from https://dialog.proquest.com/professional/docview/1074440495?accountid=131444 (Year: 2009).*
(Continued)

*Primary Examiner* — Jeffrey A. Smith
*Assistant Examiner* — Ashley D Preston
(74) *Attorney, Agent, or Firm* — BRYAN CAVE LEIGHTON PAISNER LLP

(57) ABSTRACT

A method including determining, in real-time, a diversity preference score for a user based at least in part on an anchor item chosen by the user via a user interface executed on a user device of the user. The method also can include determining, in real-time, a comparison result between the diversity preference score and a diversity preference threshold. The method further can include generating, in real-time, a personalized recommendation pool based on (a) the comparison result, (b) a complementary recommendation pool generated based at least in part on the anchor item, and (c) a diversity objective function. In many embodiments, when the comparison result indicates that the diversity preference score is greater than the diversity preference threshold, the diversity objective function can be associated with cross-domain diversity. In a number of embodiments, when the comparison result indicates that the diversity preference score is not greater than the diversity preference threshold, the diversity objective function can be associated with within-domain diversity. The method additionally can include transmitting, in real-time through the computer network, the personalized recommendation pool to be dis-
(Continued)

played with the anchor item on the user interface. Other embodiments are disclosed.

20 Claims, 6 Drawing Sheets

(56) References Cited

U.S. PATENT DOCUMENTS

| | | | | |
|---|---|---|---|---|
| 10,102,559 | B1* | 10/2018 | Jain | G06Q 30/0631 |
| 11,004,135 | B1* | 5/2021 | Sandler | G06Q 30/0631 |
| 11,487,823 | B2* | 11/2022 | Karayev | G06N 3/08 |
| 2009/0132459 | A1* | 5/2009 | Hicks | G06Q 30/0269 |
| | | | | 706/52 |
| 2020/0184537 | A1* | 6/2020 | Kumar | G06N 7/005 |
| 2021/0374132 | A1* | 12/2021 | Yang | G06F 16/2457 |

OTHER PUBLICATIONS

Mohamed Hussein Abdi, George Onyango Okeyo, and Ronald Waweru Mwangi, "Matrix Factorization Techniques for Context-Aware Collaborative Filtering Recommender Systems: A Survey," Computer and Information Science, vol. 11, No. 2 (2018), pp. 1-10, https://doi.org/10.5539/cis.v11n2p1, 2018.

Gediminas Adomavicius and YoungOk Kwon, "Improving Aggregate Recommendation Diversity Using Ranking-Based Techniques," IEEE Trans. Knowl, Data Eng. 24, 5 (2012), pp. 896-911, https://doi.org/10.1109/TKDE.2011.15, 2012.

Oren Barkan and Noam Koenigstein, "Item2vec: Neural Item Embedding for Collaborative Filtering," In Proceedings of the Poster Track of the 10th ACM Conference on Recommender Systems (RecSys 2016), Boston, USA, Sep. 17, 2016 (CEUR Workshop Proceedings), vol. 1688, CEUR-WS.org, http://ceur-ws.org/Vol-1688/paper-13.pdf, 2016.

Laming Chen, Guoxin Zhang, and Eric Zhou, "Fast Greedy MAP Inference for Determinantal Point Process to Improve Recommendation Diversity," In Advances in Neural Information Processing Systems 31: Annual Conference on Neural Information Processing Systems 2018, NeurIPS 2018, Dec. 3-8, 2018, Montreal, Canada, pp. 5627-5638, http://papers.nips.cc/paper/7805-fast-greedy-map-inference-for-determinantal-point-process-to-improve-recommendation-diversity, 2018.

Jorge Díez, David Martinez-Rego, Amparo Alonso-Betanzos, Oscar Luaces, and Antonio Bahamonde, "Optimizing Novelty and Diversity in Recommendations," Progress in Artificial Intelligence, vol. 8, pp. 101-109 (2019), https://doi.org/10.1007/s13748-018-0158-4, 2019.

Valeria Fionda and Giuseppe Pirro, "Triple2Vec: Learning Triple Embeddings from Knowledge Graphs," CoRR abs/1905.11691 (2019), arXiv:1905.11691, http://arxiv.org/abs/1905.11691, 2019.

The Instacart Online Grocery Shopping Dataset 2017, Accessed on May 28, 2021, at https://www.kaggle.com/c/instacart-market-basket-analysis/data.

Alex Kulesza and Ben Taskar, "Determinantal Point Processes for Machine Learning," CoRR abs/1207.6083 (2012), arXiv:1207.6083, http://arxiv.org/abs/1207.6083, 2012.

Jian-Guo Liu, Kerui Shi, and Qiang Guo, "Solving the Accuracy-Diversity Dilemma via Directed Random Walks," CoRR abs/1201.6278 (2012), arXiv:1201.6278, http:/arxiv.org/abs/1201.6278, 2012.

Yong Liu, Yinan Zhang, Qiong Wu, Chunyan Miao, Lizhen Cui, Binqiang Zhao, Yin Zhao, and Lu Guan, "Diversity-Promoting Deep Reinforcement Learning for Interactive Recommendation," CoRR abs/1903.07826 (2019), arXiv:1903.07826, http://arxiv.org/abs/1903.07826, 2019.

Julian J. McAuley, Rahul Pandey, and Jure Leskovec, "Inferring Networks of Substitutable and Complementary Products," In Proceedings of the 21st ACM SIGKDD International Conference on Knowledge Discovery and Data Mining, Sydney, NSW, Australia, Aug. 10-13, 2015, ACM, pp. 785-794, https://doi.org/10.1145/2783258.2783381, 2015.

Lijing Qin and Xiaoyan Zhu, "Promoting Diversity in Recommendation by Entropy Regularizer," In IJCAI 2013, Proceedings of the 23rd International Joint Conference on Artificial Intelligence, Beijing, China, Aug. 3-9, 2013, IJCAI/AAAI, pp. 2698-2704, http://www.aaai.org/ocs/index.php/IJCAI/IJCAI13/paper/view/6511, 2013.

Panagiotis Symeonidis and Andreas Zioupos, "Matrix and Tensor Factorization Techniques for Recommender Systems," Springer, https://doi.org/10.1007/978-3-319-41357-0, 2016.

Mengting Wan, Di Wang, Jie Liu, Paul Bennett, and Julian J. McAuley, "Representing and Recommending Shopping Baskets with Complementarity, Compatibility and Loyalty," In Proceedings of the 27th ACM International Conference on Information and Knowledge Management, CIKM 2018, Torino, Italy, Oct. 22-26, 2018, ACM, pp. 1133-1142, https://doi.org/10.1145/3269206.3271786, 2018.

Mark Wilhelm, Ajith Ramanathan, Alexander Bonomo, Sagar Jain, Ed H. Chi, and Jennifer Gillenwater, "Practical Diversified Recommendations on YouTube with Determinantal Point Processes," In Proceedings of the 27th ACM International Conference on Information and Knowledge Management, CIKM 2018, Torino, Italy, Oct. 22-26, 2018, ACM, pp. 2165-2173, https://doi.org/10.1145/3269206.3272018, 2018.

Qiong Wu, Yong Liu, Chunyan Miao, Yin Zhao, Lu Guan, and Haihong Tang, "Recent Advances in Diversified Recommendation," CoRR abs/1905.06589 (2019), arXiv:1905.06589, http://arxiv.org/abs/1905.06589, 2019.

Yin Zhang, Haokai Lu, Wei Niu, and James Caverlee, "Quality-Aware Neural Complementary Item Recommendation," In Proceedings of the 12th ACM Conference on Recommender Systems, RecSys 2018, Vancouver, BC, Canada, Oct. 2-7, 2018, Sole Pera, Michael D. Ekstrand, Xavier Amatriain, and John O'Donovan (Eds.), ACM, pp. 77-85, https://doi.org/10.1145/3240323.3240368, 2018.

Cai-Nicolas Ziegler, Sean M. McNee, Joseph A. Konstan, and Georg Lausen, "Improving Recommendation Lists Through Topic Diversification," In Proceedings of the 14th International Conference on World Wide Web, WWW 2005, Chiba, Japan, May 10-14, 2005, ACM, pp. 22-32, https://doi.org/10.1145/1060745.1060754, 2005.

Wang, et al., "Personalized Re-Ranking for Improving Diversity in Live Recommender Systems," arXiv:2004.06390v2 [cs.IR], Apr. 21, 2020, https://arxiv.org/pdf/2004.06390.pdf, 2020.

Wilhelm, et al., "Practical Diversified Recommendations on YouTube with Determinantal Point Processes," CIKM '18: Proceedings of the 27th ACM International Conference on Information and Knowledge, Oct. 2018, pp. 2165-2173, https://doi.org/10.1145/3269206.3272018, 2018.

\* cited by examiner

500

510 Determining, in real-time, a diversity preference score ($S_{u,q}$) for a user ($u$) based at least in part on an anchor item ($q$) chosen by the user via a user interface executed on a user device of the user.

520 Determining, in real-time, a comparison result between the diversity preference score ($S_{u,q}$) and a diversity preference threshold ($T$).

530 Generating, in real-time, a personalized recommendation pool based at least in part on: (a) the comparison result, (b) a complementary recommendation pool generated based at least in part on the anchor item, and (c) a diversity objective function.

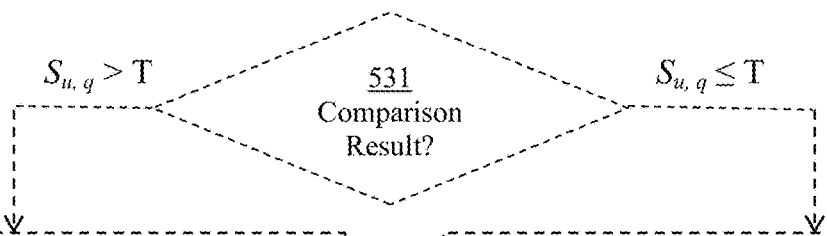

$S_{u,q} > T$     531 Comparison Result?     $S_{u,q} \leq T$

532 Calculating a diversity score based in part on: (a) a respective personalized complementary score for the each of one or more remaining items; and (b) a diversification increment by the each of one or more remaining items.

533 Calculating the diversity score based in part on: (a) the respective personalized complementary score for the each of one or more remaining items; and (b) a similarity increment by the each of one or more remaining items.

534 Adding an item from the recommended items of the complementary recommendation pool to the personalized recommendation pool iteratively based at least in part on the diversity score for the item.

540 Transmitting, in real-time through the computer network, the personalized recommendation pool to be displayed with the anchor item on the user interface.

Receive: $u, q, R, R_x, \alpha, \beta, T, z_0, k;$

Set:

$R_{out} = [\ ]$ $dept_i = tax\ (q)$ /// department of anchor item $q$ ///

/// activity 610 /// if $z_{u, dept_i}$ available then use $z_{u, dept_i}$ else

$z_{u, dept_i} = z_0$ end if

/// activity 620 /// if $z_{u, dept_i} > T$ then generate $R_d$ based on the cross-domain diversity objective function below and FG-MAP with $k$ iterations $r = \arg\max_{r \in R \setminus R_d} (\alpha S_{q,r} + (1 - \alpha)(\log(det(L_{R_d + [r]})) - \log(det(L_{R_d}))))$ $R_{out} := R_d$ else generate $R_s$ based on the within-domain diversity objective function below and FG-MAP with $k$ iterations $r = \arg\max_{r \in (R + R_x) \setminus R_s} (\beta S_{q,r} + (1 - \beta)(\log(det(L'_{R_s + [r]}))$ $- \log(det(L'_{R_s}))))$ $R_{out} := R_s$ end if

/// activity 630 /// return $R_{out}$ as the re-ranked complementary recommendation pool for $u$ and $q$

FIG. 6

SYSTEM, METHOD, AND NON-TRANSITORY COMPUTER READABLE STORAGE MEDIUM, FOR DIVERSIFYING COMPLEMENTARY ITEM RECOMMENDATIONS BASED ON USER PREFERENCES

TECHNICAL FIELD

This disclosure relates generally to a system and/or method for personalizing complementary item recommendations.

BACKGROUND

Providing complementary item recommendations is a popular technique in e-commerce to boost sales of the complementary items that customers may want but forget to find before the customers check out. Personalizing the complementary item recommendations is known to increase the chance that customers buy more than they originally plan to. However, existing recommender systems overlook customers' preferences in diversification of item recommendations. It thus can be desired to have a system and/or method for applying a personalized degree of diversification to item recommendations.

BRIEF DESCRIPTION OF THE DRAWINGS

To facilitate further description of the embodiments, the following drawings are provided in which:

FIG. 5 illustrates a flow chart for a method, according to an embodiment; and

FIG. 6 shows pseudo codes for a method, according to an embodiment.

Figure 1:
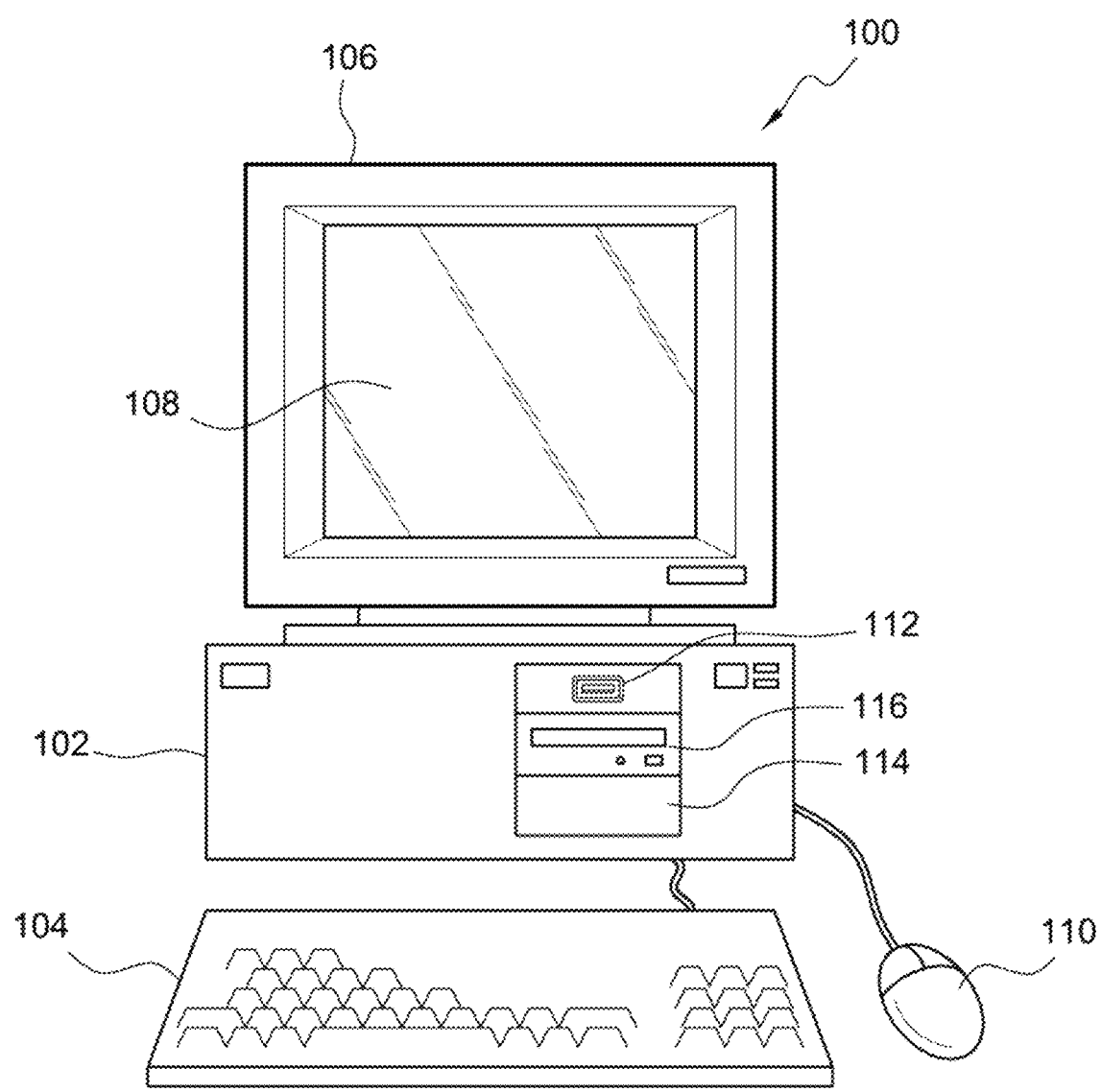
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
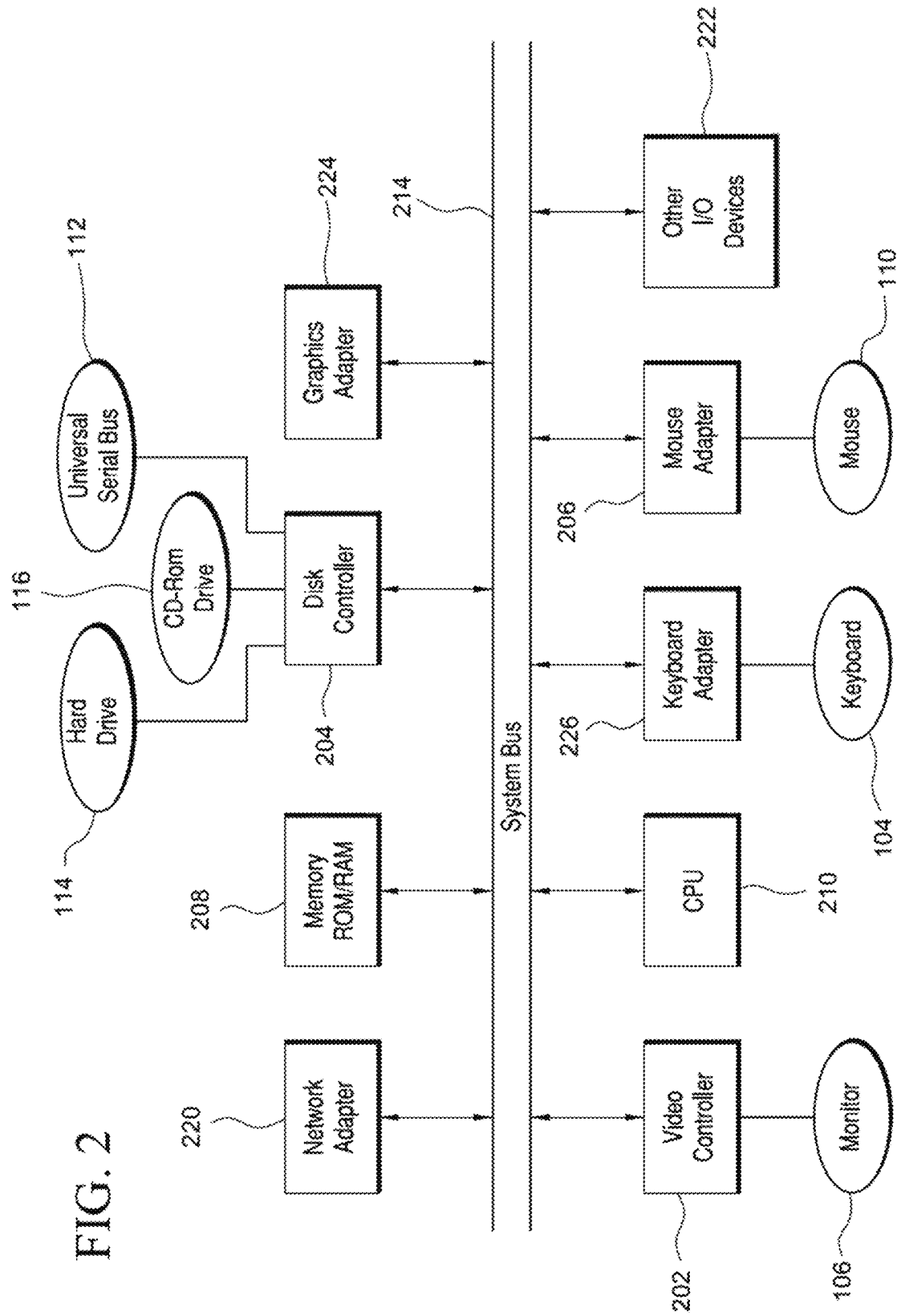
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIG. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
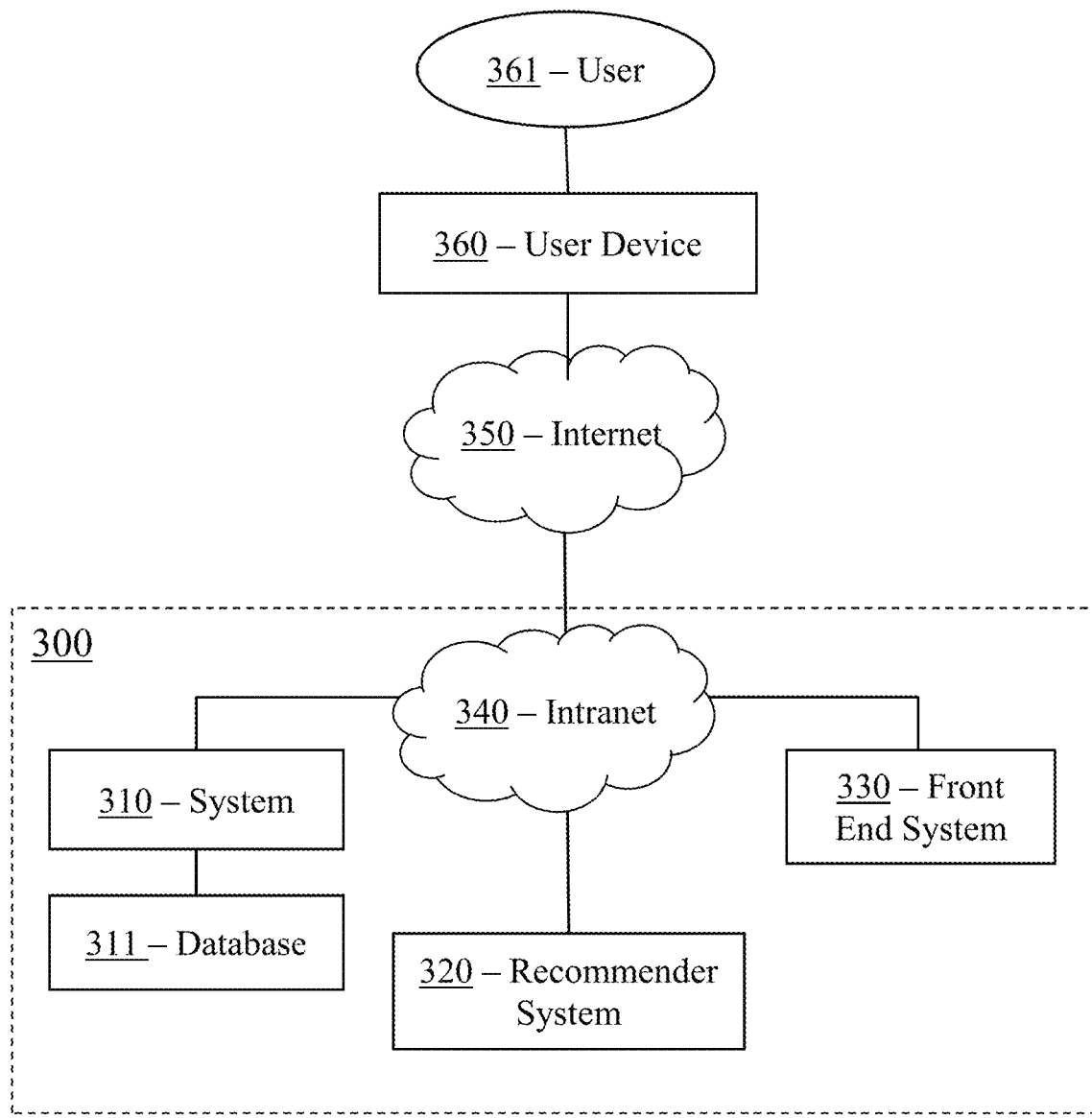
FIG. 3 illustrates a block diagram of a system that can be employed for diversifying complementary item recommendations based on user preferences, according to an embodiment.

Turning ahead in the drawings, FIG. 3 illustrates a block diagram of a system 300 that can be employed for diversifying complementary item recommendations based on personal preferences, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, operators and/or administrators of system 300 can manage system 300, the processor(s) of system 300, and/or the memory storage unit(s) of system 300 using the input device(s) and/or display device(s) of system 300, or portions thereof in each case.

In many embodiments, system 300 can include a system 310, a recommender system 320, a front end system 330, and/or a database 311. System 310, recommender system 320, and/or front end system 330 can each be a computer system, such as computer system 100 (FIG. 1), as described above, and can each be a single computer, a single server, or a cluster or collection of computers or servers, or a cloud of computers or servers. In another embodiment, a single computer system can host system 310, recommender system 320, and/or front end system 330. In a few embodiments, system 310 can include recommender system 320 and/or front end system 330. Additional details regarding system 310, recommender system 320, and/or front end system 330 are described herein.

Referring to FIG. 3, in some embodiments, system 310 can be in data communication with recommender system 320, and/or front end system 330 directly or using any suitable computer network, including Internet 350 or an internal network that is not open to the public (e.g., Intranet 340). Communication between system 310, recommender system 320, and/or front end system 330 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Meanwhile, in many embodiments, system 310, recommender system 320, and/or front end system 330 also can be configured to communicate with and/or include one or more databases (e.g., a database 311). The one or more databases can include a product database that contains information about products, items, or SKUs (stock keeping units), for example, among other data as described herein. The one or more databases also can include a user database that contains information about users of system 300, such as user profiles, transaction histories, search histories, and/or browse histories, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In some embodiments, system 300 can be in data communication through Internet 350 with one or more user devices, such as a user device 360. In some embodiments, a user device (e.g., user device 360) can be a computer system (e.g., computer system 100 (FIG. 1)) used by a user (e.g., a user 361). In many embodiments, system 300, system 310, or front end system 330 can host one or more websites and/or mobile application servers. For example, front end system 330 can host a website, or provide a server that interfaces with a mobile application on user device 360, which can allow user 361 to browse and/or search for items (e.g., products, grocery items), to add items to an electronic cart, to purchase items, and/or request grocery delivery, in addition to other suitable activities.

In certain embodiments, user devices (e.g., user device 360) can be desktop computers, laptop computers, a mobile device, and/or other endpoint devices used by users (e.g., user 361). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Still referring to FIG. 3, in a number of embodiments, upon receiving a selection of an anchor item by a user (e.g., user 361), recommender system 320 can generate a complementary recommendation pool with recommended items for the user based at least in part on the anchor item. In many embodiments, recommender system 320 can use any suitable models to analyze user preferences and/or item co-purchase relationships for generating the complementary recommendation pool based on the anchor item. In some embodiments, recommender system 320 can communicate with or include a customer understanding platform (e.g., system 400 (FIG. 4), as described below) for prototyping customer preferences over product features (e.g., brands, flavors, prices, etc.). In a few embodiments, recommender system 320 can include an embedding-based model (e.g., item2vec, prod2vec, metapath2vec, or triple2vec) to determine likelihood of co-purchase between items for each user. In many embodiments, the selection of anchor item can be provided by user 361 via a user interface executed on user device 360 and transmitted through a computer network (e.g., Internet 350) to one or more websites and/or mobile application servers hosted by system 310, recommender system 320, or front end system 330. In embodiments where the one or more websites and/or mobile application servers are hosted by front end system 330, front end system 330 can forward, directly or through Intranet 340 and/or Internet 350, the selection of the anchor item to system 310 and/or recommender system 320.

In a number of embodiments where the complementary recommendation pool is generated by recommender system 320, system 310 can receive the complementary recommendation pool, directly or via Intranet 340 or Internet 350, from recommender system 320. In many embodiments, after obtaining the complementary recommendation pool, system 310 can generate, in real-time, a personalized recommendation pool based at least in part on the user's preference for diversity in item recommendations and the complementary recommendation pool. In some embodiments, after the personalized recommendation pool is generated, system 300 can transmit the personalized recommendation pool through Internet 350 to be displayed with the anchor item on the user interface for user 361, such as at the bottom of the webpage for the anchor item. In several embodiments, system 300 can transmit the personalized recommendation pool to user 361 via the websites and/or mobile application servers hosted by front end system 330.

Figure 4:
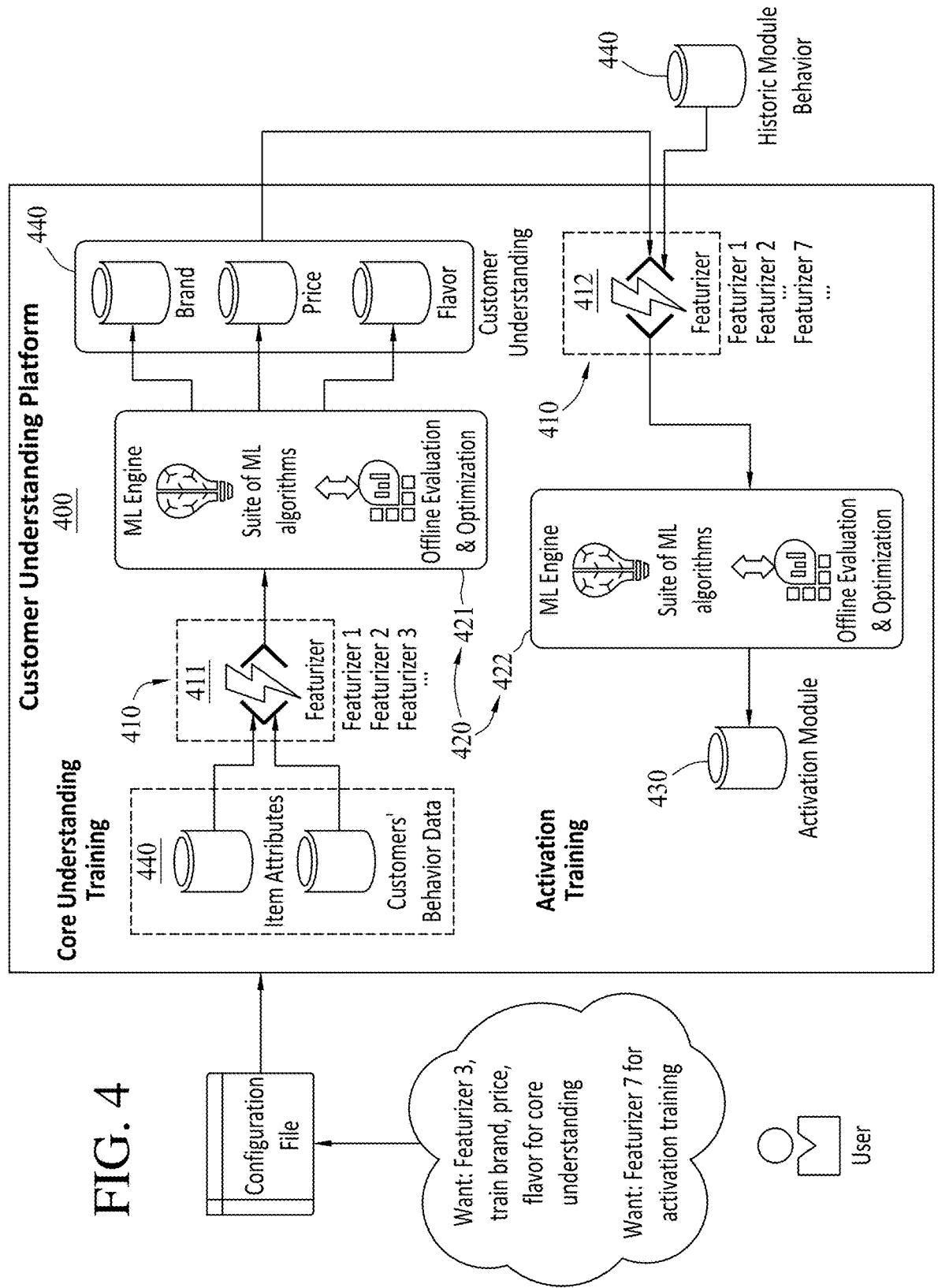
FIG. 4 illustrates a block diagram of a system that can be employed for understanding user preferences, according to an embodiment.

Turning ahead in the drawings, FIG. 4 illustrates a block diagram of a system 400 that can be employed for understanding user preferences by machine learning, according to an embodiment. System 400 is merely exemplary, and embodiments of the system are not limited to the embodiments presented herein. The system can be employed in many different embodiments or examples not specifically depicted or described herein. In some embodiments, certain elements, modules, models, or systems of system 400 can perform various procedures, processes, and/or activities. In other embodiments, the procedures, processes, and/or activities can be performed by other suitable elements, modules, models, or systems of system 400. System 400 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 400 described herein.

In a number of embodiments, operators and/or administrators of system 400 can manage system 400, the processor(s) of system 400, and/or the memory storage unit(s) of system 400 using the input device(s) and/or display device(s) of system 400, or portions thereof in each case.

In many embodiments, system 400 can include one or more feature converters 410, one or more machine-learning models 420, a customer activation model 430, and/or one or more database 440. Feature converters 410, machine-learning models 420, and/or customer activation model 430 can each be a computer system, such as computer system 100 (FIG. 1), as described above, and can each be a single computer, a single server, or a cluster or collection of computers or servers, or a cloud of computers or servers. In another embodiment, a single computer system can host feature converters 410, machine-learning models 420, and/or customer activation model 430. Additional details regarding feature converters 410, machine-learning models 420, and/or customer activation model 430 are described herein.

Referring to FIG. 4, in some embodiments, feature converters 410 can be in data communication with machine-learning models 420 and/or customer activation model 430 directly or via any suitable computer network, including the Internet or an internal network that is not open to the public. Communication between feature converters 410, machine-learning models 420, and/or customer activation model 430 can be implemented using any suitable manner of wired and/or wireless communication. Accordingly, system 400 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Meanwhile, in many embodiments, feature converters 410, machine-learning models 420, and/or customer activation model 430 also can be configured to communicate with and/or include one or more databases (e.g., databases 440). The one or more databases can include an item attribute database that contains information about products, items, or SKUs (stock keeping units), for example, among other data as described herein. The one or more databases also can include a customer behavior database that contains information about historical customer data, such as transaction histories, search histories, and/or browse histories, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Still referring to FIG. 4, in some embodiments, feature converters 410 can comprise a feature converter 411 (alternatively called as a featurizer 411) that can convert raw data into one or more predefined formats. For example, the raw data can include item attributes (e.g., brands, prices, flavors, categories, and/or departments, etc.), customer behavior data (e.g., a customer's transaction history, browse history, and/or search history, etc.), and/or other suitable information. In a number of embodiments, feature converters 410 further can comprise a feature converter 412 (alternatively referred to as a featurizer 412) that can convert the formats of data form different sources to formats acceptable by a downstream model or system that receives the data (e.g., a machine learning model 422).

In a number of embodiments, machine-learning models 420 can include a machine learning model 421 for determining customer preferences over predefined item attributes (e.g., brands, prices, and/or flavors) based on customer behavior data. In certain embodiments, machine learning model 421 further can determine the respective weight or coefficient for each of the attributes for each customer in terms of customer preferences. In some embodiments, machine-learning models 420 additionally can include a machine learning model 422 for refining the customer preferences learned by machine learning model 421 based at least in part on historic module behavior. In many embodiments, machine learning models 420 as trained can determine the importance of each of the attributes of an item (e.g., of a particular brand or in a particular flavor) to a user's buying decision and predict the likelihood of purchase by the user for the item based on the attributes. For example, in some embodiments, machine learning models 420 as trained can predict the attribute value (attri_val) with a maximum probability for each user (user) and each attribute key (attr_key) (e.g., $\max_{attr\_val} p(attr\_val|user, attr\_key)$, and in turn map the probability to a score indicating a user preference that can be used in ranking the search results and/or recommended item.

In many embodiments, machine learning models 420 each can be implemented by any suitable software components, hardware components, and/or various combinations thereof, of system 400. For example, in some embodiments, machine learning models 420 each can adopt any suitable algorithms, such as decision tree, logistic regression, random forest, and so forth. In some embodiments, machine learning model 421 can be implemented through any suitable software development platforms or open source software packages, such as TensorFlow, Theano, PyTorch, PySpark, or Scikit-learn, and can be written in any suitable languages, such as Python, C++, and/or CUDA.

In some embodiments, customer activation model 430 can enhance customer engagement by personalizing customer interactions based on customer preferences learned in one or more machine learning models (e.g., machine learning models 420). In many embodiments, customer activation model 430 can be implemented by any suitable software components, hardware components, and/or various combinations thereof, of system 400. In a number of embodiments, customer activation model 430 can communicate with or include a search engine or a recommender system (e.g., recommender system 320 (FIG. 3)) for an e-commerce platform for personalizing item search results and/or item recommendations.

Turning ahead in the drawings, FIG. 5 illustrates a flow chart for a method 500 of diversifying the complementary recommendations based on user preference, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3), system 310 (FIG. 3), or system 400 (FIG. 4) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), or system 400 (FIG. 4). The processor(s) can be similar or identical to the processor(s) described above with respect to computer system 100 (FIG. 1).

In some embodiments, method 500 and the procedures, the processes, and/or the activities in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, in a number of embodiments, method 500 can include a block 510 of determining, in real-time, a diversity preference score for a user (e.g., user 361 (FIG. 3)) based at least in part on an anchor item chosen by a user via a user interface executed on a user device (e.g., user device 360 (FIG. 3)) of the user. In many embodiments, block 510 can determine the diversity preference score based on any suitable methods. In certain embodiments, block 510 can determine the diversity preference score further based on the number of different domains for items the user previous purchased with the anchor item or after the user purchased the anchor item or items similar to the anchor item (e.g., items in the same domain as the anchor item). In several embodiments, the diversity preference score for the user or the equation for block 510 to determine the diversity preference score can be generated by a machine learning model (e.g., machine learning models 420 (FIG. 4)) that is pre-trained from the user's behavior data. In many embodiments, a domain for an item can be defined based on: the department for the item in the taxonomy hierarchy level of an e-commerce web site, the category for the item in a product catalog, or the section or aisle for the item in a retail store, for example. In an embodiment, lunch meat, American cheese, and ham can categorized as in the same domain "meat & cheese," while pork sausage, bacon, and pepperoni are in a different domain, "bacon, hot dogs & sausage," as defined on an online grocery website. In another embodiment, lunch meat, American cheese, ham, pork sausage, bacon, and pepperoni can be in the same domain, "delicatessen." In yet another embodiment, lunch meat, ham, pork sausage, and bacon can be in a first domain, "pork," American cheese can be in a second domain, "cheese," and pepperoni can be in a third domain, "beef."

In a few embodiments, block 510 can determine the diversity preference score by: (a) determining a respective department for each of a predetermined number of items previously purchased by the user after the user purchased the anchor item; (b) determining, in real-time, a count of different departments among the respective department for each of the predetermined number of items; and/or (c) determining, in real-time, the diversity preference score based at least in part on the count of different departments. The predetermined number can be any suitable number (e.g., 5, 10, 20, or 50), or it can be adjustable by an operator or administrator of the system (e.g., system 300 (FIG. 3), system 310 (FIG. 3), or system 400 (FIG. 4)). For example, the diversity preference score for the user in terms of the anchor item can be determined in block 510 based on:

$$z_{u,q} = \frac{|B_{T,q}|}{k},$$

wherein:
 u: the user;
 q: the anchor item;
 k: the predetermined number for the items purchased after the purchase of anchor item q;
 $B_{T,q} = \{tax(b_{t+1}), \ldots tax(b_{t+k})\}$, wherein:
  t represents the transaction sequence of the anchor item q;
  b represents an item of the k items purchased after the user purchased the anchor item q; and
  tax (b) represents the department of item b; and
 $|B_{T,q}|$: the number of different departments among the departments for the k items.

In a number of embodiments, block 510 can determine the diversity preference score for the user based in part on a department-level diversity preference. In some embodiment, block 510 can determine the diversity preference score by: (a) determining one or more (N) items in an anchor department ($dept_i$) of the anchor item that the user has purchased; (b) determining a respective department ($B_{T,q}$) for each of a predetermined number (k) of items previously purchased by the user after the user purchased an item (q) of the one or more (N) items in the anchor department ($tax(q)=dept_i$); (c) determining, in real-time, a count of different departments ($|B_{T,q}|$) among the respective department ($B_{T,q}$) for each of the predetermined number of items for the item (q); and/or (d) determining, in real-time, the diversity preference score further based at least in part on the count of different departments ($|B_{T,q}|$) for the item (q). For example, in several embodiments, block 510 can determine the diversity preference score for the user in view of the anchor item based on:

$$z_{u,dept_i} = \frac{1}{N} \sum_{\{q|tax(q)=dept_i\}}^{N} z_{u,q} = \frac{1}{N} \sum_{\{q|tax(q)=dept_i\}}^{N} \frac{|B_{T,q}|}{k},$$

wherein:
 u: the user;
 $dept_i$: the anchor department of the anchor item;
 q: an item in the anchor department;

$$z_{u,q} = \frac{|B_{T,q}|}{k},$$

similar or identical to the equation above; and
 N: the number of items in the anchor department.

Referring again to FIG. 5, in a number of embodiments, method 500 additionally can include a block 520 of determining, in real-time, a comparison result between the diversity preference score ($S_{u,q}$) for the user (u) in view of the anchor item (q) and a diversity preference threshold (T). The diversity preference threshold can be a predetermined number (e.g., 0.1, 0.2, 0.3, 0.5, 0.8, or 1.0, etc.), adjustable by an operator or administrator of the system (e.g., system 300 (FIG. 3), system 310 (FIG. 3), or system 400 (FIG. 4)), or set by a machine learning model (e.g., machine learning models 420 (FIG. 4)) pre-trained based in part on the performance of prior diversified item recommendations to all of the users. The comparison result can be that the diversity preference score is greater than, equal to, or less than the diversity preference threshold.

In some embodiments, method 500 also can include a block 530 of generating, in real-time, a personalized recommendation pool based at least in part on: (a) the comparison result, (b) a complementary recommendation pool generated based at least in part on the anchor item, and/or (c) a diversity objective function. In many embodiments, the complementary recommendation pool can be generated by a recommender server (e.g., recommender system 320 (FIG. 3), system 310 (FIG. 3), or activation model 430 (FIG. 4)) based at least in part on the anchor item. In a number of embodiments, the complementary recommendation pool can include recommended items ranked according to a respective personalized complementary score for each of the recommended items. For example, the respective personalized complementary score for an item of the recommended items can be determined by the recommender server based at least in part on likelihood that the user would purchase the item with the anchor item. In certain embodiments, the likelihood can be determined based on one or more of: the user's purchase, search, and/or browse history, and/or the purchase, search, and/or browse histories of all of the users. In some embodiments, when the comparison result indicates that the diversity preference score is greater than the diversity preference threshold, the diversity objective function can be associated with cross-domain diversity. In a few embodiments, when the comparison result indicates that the diversity preference score is not greater than the diversity preference threshold, the diversity objective function can be associated with within-domain diversity.

In a number of embodiments, block 530 further can include re-ranking, in real-time, the recommended items of the complementary recommendation pool based on the diversity objective function. In many embodiments, the diversity objective function can be any suitable function for diversifying recommended items of the complementary recommendation pool based on the comparison result. In some embodiments, when the diversity objective function is associated with cross-domain diversity, block 530 can re-rank the recommended items by increasing the heterogeneity of the recommended items in the complementary recommendation pool. For example, in some embodiments where the recommended items are ranked in the complementary recommendation pool based on the respective personalized complementary score, block 530 can re-rank the recommended items by increasing the respective personalized complementary score of each recommended item in a non-anchor department based on the degree of difference between the each recommended item and the anchor item. In another exemplary embodiment, block 530 can re-rank the recommended items by including recommended items from as many different departments as possible in the top rankings in the complementary recommendation pool (e.g., the top 10 recommended items including at least one recommended item from each of the 4 departments in the complementary recommendation pool). In similar or different embodiments, when the diversity objective function is associated with within-domain diversity, block 530 can re-rank the recommended items by increasing the homogeneity of the recommended items in the complementary recommendation pool. For example, in some embodiments, block 530 can re-rank the recommended items by giving recommended items from the anchor department higher respective personalized complementary scores (e.g., increasing the respective personalized complementary scores by 5%) in the complementary recommendation pool.

In a number of embodiments, block 530 further can include reducing a size of the complementary recommendation pool based on a predetermined size limit before generating the personalized recommendation pool. In certain embodiments, the predetermined size limit can be determined based on a type of user interface for displaying the personalized recommendation pool (e.g., 20 recommended items for a webpage, 5 recommended items for a graphical user interface for a mobile application, mobile browser webpage, or application on a wearable device such as a smart watch). In some embodiments, the personalized recommendation pool generated in block 530 can include all or some of the recommended items of the complementary recommendation pool.

Still referring to FIG. 5, in a number of embodiments, block 530 can include block 531 of determining the diversity objective function based on the comparison result. In many embodiments, when the comparison result indicates that the diversity preference score is greater than the diversity preference threshold, block 530 can include block 532 of calculating a diversity score based on a cross-domain diversity objective function. In some embodiments, the cross-domain diversity objective function can determine the diversity score based at least in part on: (a) a respective personalized complementary score for the each of one or more remaining items; and/or (b) a diversification increment by the each of one or more remaining items.

In some embodiments, when the comparison result indicates that the diversity preference score is not greater than the diversity preference threshold, block 530 can include block 533 of calculating the diversity score based on a within-domain diversity objective function. In a number of embodiments, the within-domain diversity objective function can determine the diversity score based at least in part on: (a) the respective personalized complementary score for the each of one or more remaining items; and/or (b) a similarity increment by the each of one or more remaining items.

In a number of embodiments, block 530 additionally can include block 534 of adding an item from the recommended items of the complementary recommendation pool to the personalized recommendation pool iteratively based at least in part on the diversity score for the item, determined in block 532 or block 533. In a number of embodiments, block 534 can add the item of the one or more remaining items to the personalized recommendation pool when the item is associated with a maximal respective diversity score of a respective diversity score for each of one or more remaining items determined in block 532 or block 533. In some embodiments, the iterations of adding items in block 534 can stop when a predetermined size limit of the personalized recommendation pool is reached or when there is no non-added recommended items remaining in the complementary recommendation pool. In several embodiments, after block 534 finishes adding items to the personalized recommendation pool, the recommended items of the personalized recommendation pool can be already ranked in descending order based on the respective diversity score of each of the recommended items.

In many embodiments, block 534 can add an item from the recommended items of the complementary recommendation pool to the personalized recommendation pool iteratively based at least in part on a determinantal point process (DPP) with fast greedy maximum a posteriori (MAP) inference. A determinantal point process (DPP) is a probabilistic model. A DPP on a discrete set $Z=\{1, 2, \ldots M\}$ is characterized that a probability measure P for each subset Y ($Y \subseteq Z$) is proportional to the determinant of $L_Y$, and that $L_Y$ is a submatrix of a symmetric, positive semidefinite, and real matrix $L \in R^{M \times M}$, as shown below. L serves as a kernel matrix indexed by the elements in Z.

$$P(Y) \propto \det(L_Y), \text{ where: } L_Y \in R^{|Y| \times |Y|}; \text{ and } |Y|\text{:size of } Y.$$

In a number of embodiments, Fast Greedy Maximum a Posteriori Inference (FG-MAP) approximates and simplifies MAP inference in a greedy approach. In some embodiments where DPP with FG-MAP is adopted, block 534 can greedily select a next recommended item (e.g., j or $r_i$ below) from the recommended items of the complementary recommendation pool (e.g., Z or R below) to grow the personalized recommendation pool (e.g., $Y \subseteq Z$) iteratively based at least in part on the respective diversity score ($\log(\det(L_{Y_g \cup \{j\}}))-\log(\det(L_{Y_g}))$) of the next recommended item (e.g., j), determined in block 532 and/or block 533 based on the L chosen:

$$j = \arg\max_{j \in Z \setminus Y_g}(\log(\det(L_{Y_g \cup \{j\}}))-\log(\det(L_{Y_g})))$$

In many embodiments, the complementary recommendation pool can be generated based on embedding-based methods, such as item2vec, prod2vec, metapath2ver, or triple2vec, and L can be any suitable embedding-based kernel matrix that can be initialized by the item-to-item similarity matrix based on the item embedding. In some embodiments where the triple2vec model and the DPP with FG-MAP approach are used, block 530 can define L as below:

$$L = \frac{1 + H^T H}{2},$$

wherein:

$H \equiv \{g_{r_i} | r_i \in R\}$, a sub-matrix of the item embeddings for the item pool R recalled by the triple2vec model;

$g_{r_i}$: normalized embedding of item $r_i$; and $H^T H$ can be shifted and rescaled to ensure that L is positive semidefinite.

In many embodiments, block 532 can modify the FG-MAP approach above into bi-criterion optimization. In a number of embodiments, block 532 can determine the diversity score based on the diversity objective function associated with cross-domain diversification (i.e., a cross-domain diversity objective function) for block 534 to add the next item r as below:

$$r = \arg\max_{r \in R \setminus R_d}(\alpha S_{q,r} + (1-\alpha)(\log(\det(L_{R_d+[r]})) - \log(\det(L_{R_d}))))$$

wherein:

α: a constant between 0 and 1;

q: the anchor item;

r: the next recommended item of the complementary recommendation pool to be added to the personalized recommendation pool;

$$S_{q,r} = \frac{1 + f_q^T g_r}{2},$$

an item-to-item complementarity for items (q, r) in a triple2vec model;

$f_q^T$ and $g_r$: normalized item embeddings, where $f_q$ and $q_r$ are two sets of representations/embeddings for items (q, r) in the triple2vec model;

R: the complementary recommendation pool;

$R_d$: the current personalized recommendation pool, before r is added;

L: an item-to-item similarity matrix based on the item embedding.

In some embodiments, block 533 can determine the diversity score based on the diversity objective function associated with within-domain diversification (i.e., a within-domain diversity objective function) for block 534 to add the next item r as below:

$$r = \arg\max_{r \in (R+R_s) \setminus R_s}(\beta S_{q,r} + (1-\beta)(\log(\det(L'_{R_s+[r]})) - \log(\det(L'_{R_s}))))$$

wherein:

β: a constant between 0 and 1;

q: the anchor item;

$r_i$: a recommended item of the complementary recommendation pool;

$$S_{q,r} = \frac{1 + f_q^T g_r}{2},$$

an item-to-item complementarity for items (q, r) in a triple2vec model;

$f_q^T$ and $g_r$: normalized item embeddings, where $f_q$ and $q_r$ are two sets of representations for items (q, r) in the triple2vec model;

R: the complementary recommendation pool;

$R_x$: an extra pool of recommended items;

$R_s$: the current personalized recommendation pool, before r is added; and $L' = 1 + \text{diag}(L) - L$, a dissimilarity matrix based on a similarity matrix L.

In a number of embodiments, the complementary recommendation pool (R) used in the diversity objective function (a cross-domain diversity objective function or a within-domain diversity objective function) can be downsized (e.g., reducing from 100 items to top 50 items) before block 532 or 533 determines the respective diversity score for each of recommended items of the complementary recommendation pool. In similar or different embodiments, the extra pool of recommended items ($R_s$) in block 533 can include the recommended items removed from the complementary recommendation pool (R), such as the 51st to the 70th items of the original complementary recommendation pool (R), before downsizing. In some embodiments, the extra pool of recommended items ($R_s$) in block 533 can be obtained, via a computer network (e.g., Intranet 340 (FIG. 3) or Internet 350 (FIG. 3)), from a recommender system (e.g. recommender system 320 (FIG. 3)). In certain embodiments, the extra pool of recommended items (R in block 533 can be generated by block 533 or method 500.

In several embodiments, method 500 further can include a block 540 of transmitting, in real-time directly or indirectly through the computer network (e.g., Internet 350 (FIG. 3)), the personalized recommendation pool to be displayed with the anchor item on the user interface.

Turning ahead in the drawings, FIG. 6 show pseudo codes for a method 600 of diversifying the complementary recommendations based on user preference, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 500 can be performed in the order presented. In other embodiments, the procedures, the processes, and/or the activities of method 600 can be performed in any suitable order. In still other embodiments, one or more of the procedures, the processes, and/or the activities of method 500 can be combined or skipped.

In many embodiments, system 300 (FIG. 3), system 310 (FIG. 3), or system 400 (FIG. 4) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), or system 400 (FIG. 4). The processor(s) can be similar or identical to the processor(s) described above with respect to computer system 100 (FIG. 1).

In some embodiments, method 600 and the procedures, the processes, and/or the activities in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, in a number of embodiments, method 600 can receive input data from an upstream method, module, model, or system (e.g., system 300 (FIG. 3), system 310 (FIG. 3), system 400 (FIG. 4), or method 500 (FIG. 5)). The input data can include one or more of: a user (u), an anchor item (q), a complementary recommendation pool (R), an extra complementary recommendation pool ($R_x$), diversification coefficients for cross-domain and/or within-domain diversity objective function (α and β, both between 0 and 1, such as 0.01, 0.02, 0.1, or 0.2, etc.), the diversity preference threshold (T), the default diversity preference score ($z_0$), and/or the size of an output re-ranked complementary recommendation pool (k), etc.

In some embodiments, method 600 can include activity 610 of determining a diversity preference score for a user based at least in part on an anchor item chosen by the user. In many embodiments, activity 610 can be similar or identical to block 510 (FIG. 5). In some embodiments, the diversity preference score (z) for the user (u) based at least in part on the anchor item (q) in an anchor department ($dept_i$) can be $Z_{u,dept_i}$, as in block 510 (FIG. 5), when $Z_{u,dept_i}$ is available; and if $z_{u,dept_i}$ is not available (e.g., the user has not purchased any items from the anchor department $dept_i$), the diversity preference score can be set as a default value (e.g., the input value $z_0$). In a few embodiments, the default value for the diversity preference score can be any suitable number, such as a predefined value (e.g., 0.1, 0.15, 0.2, 0.3, 0.5, 0.7, 0.8, 0.85, 0.9, etc.), an average value of all available diversity preference scores for the user, an average value of diversity preference scores for the anchor department ($dept_i$) for all of the other users, or any suitable estimations based on any suitable machine learning models adopted in the embodiments, etc.

In a number of embodiments, method 600 further can include activity 620 of generating the output complementary recommendation pool ($R_{out}$). In many embodiments, activity 620 can be similar or identical to blocks 520 and 530 (FIG. 5). In some embodiments, when the diversity preference score ($z_{u,dept_i}$) is greater than the diversity preference threshold (T), activity 620 can generate the re-ranked complementary recommendation pool ($R_d$) by adding a recommended item (r) one at a time based on the FG-MAP approach and the cross-domain diversity objective function that is similar or identical to the cross-domain diversity objective function in block 532 (FIG. 5).

In several embodiments, when the diversity preference score ($z_{u,dept_i}$) is not greater than the diversity preference threshold (T), activity 620 can generate the re-ranked complementary recommendation pool ($R_s$) by adding a recommended item (r) one at a time based on the FG-MAP approach and the within-domain diversity objective function that is similar or identical to the within-domain diversity objective function in block 533 (FIG. 5).

In a number of embodiments, method 600 further can include activity 630 of returning the re-ranked complementary recommendation pool ($R_{out}=R_d$ or $R_s$), to be displayed with the anchor item (q) on a user interface for the user (u), for example.

In many embodiments, the techniques described herein can provide several technological improvements. In some embodiments, the techniques described herein can improve a recommender system by increasing the precision in personalization of complementary item recommendations. In many embodiments, the techniques described herein can automatically learn user preferences over diversification based on the anchor item and historical data and re-rank recommended items for the anchor item accordingly in real-time.

In many embodiments, the techniques described herein can be used continuously at a scale that cannot be handled using manual techniques. For example, the number of users concurrently browsing or searching items on an e-commerce site can be at least hundreds or thousands, and the determination of each user's preference over diversification associated with an anchor item and the re-ranking of complementary item recommendations based on each user's preference for the hundreds or thousands of users cannot be handled manually in real-time.

In a number of embodiments, the techniques described herein can solve a technical problem that arises only within the realm of computer networks, as e-commerce does not exist outside the realm of computer networks. Moreover, the techniques described herein can solve a technical problem that cannot be solved outside the context of computer networks. Specifically, the techniques described herein cannot be used outside the context of computer networks, in view of a lack of data.

Various embodiments can include a system including one or more processors and one or more non-transitory computer-readable media storing computing instructions configured to run on the one more processors and perform certain acts. The acts can include determining, in real-time, a diversity preference score for a user based at least in part on an anchor item chosen by the user via a user interface executed on a user device of the user. The acts further can include determining, in real-time, a comparison result between the diversity preference score and a diversity preference threshold. The acts additionally can include generating, in real-time, a personalized recommendation pool based on (a) the comparison result, (b) a complementary recommendation pool generated based at least in part on the anchor item, and (c) a diversity objective function. In a number of embodiments, when the comparison result indicates that the diversity preference score is greater than the diversity preference threshold, the diversity objective function can be associated with cross-domain diversity. In some embodiments, when the comparison result indicates that the diversity preference score is not greater than the diversity preference threshold, the diversity objective function can be associated with within-domain diversity. The acts also can include transmitting, in real-time through the computer network, the personalized recommendation pool to be displayed with the anchor item on the user interface.

Various embodiments can include a method being implemented via execution of computing instructions configured to run at one or more processors and stored at one or more non-transitory computer-readable media. The method can include determining, in real-time, a diversity preference score for a user based at least in part on an anchor item chosen by the user via a user interface executed on a user device of the user. The method also can include determining, in real-time, a comparison result between the diversity preference score and a diversity preference threshold. The method further can include generating, in real-time, a personalized recommendation pool based on (a) the comparison result, (b) a complementary recommendation pool generated based at least in part on the anchor item, and (c) a diversity objective function. In many embodiments, when the comparison result indicates that the diversity preference score is greater than the diversity preference threshold, the diversity objective function can be associated with cross-domain diversity. In a number of embodiments, when the comparison result indicates that the diversity preference score is not greater than the diversity preference threshold, the diversity objective function can be associated with within-domain diversity. The method additionally can include transmitting, in real-time through the computer network, the personalized recommendation pool to be displayed with the anchor item on the user interface.

Although systems and methods for diversifying the complementary item recommendations based on user preferences have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 5 and/or 6 may include different procedures, processes, and/or activities and be performed by many different modules, in many different orders, and/or one or more of the procedures, processes, or activities of FIGS. 5 and/or 6 may include one or more of the procedures, processes, or activities of another different one of FIGS. 5 and/or 6. As another example, the elements, modules, models, or systems within system 300 in FIG. 3 and/or system 400 in FIG. 4 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when run on the one or more processors, cause the one or more processors to perform:
training iteratively an embedding-based machine learning module to generate a recommendation pool for a reference item, comprising:
converting each item attribute of item attributes into a respective predefined data format of one or more predefined attribute formats;
generating item embeddings based on the item attributes, as converted, for training items;
generating customer embeddings based on customer behavior data for customers;
training the embedding-based machine learning module to determine customer item preference coefficients based on the item embeddings and the customer embeddings;
training the embedding-based machine learning module to determine a respective likelihood of co-purchase between a first item and a second item of the training items for each customer of the customers based on the customer item preference coefficients; and
re-training the embedding-based machine learning module further based at least in part on historic behavior of the embedding-based machine learning module;
determining, in real-time, a diversity preference score for a user based at least in part on: (a) an anchor item chosen by the user via a user interface executed on a user device of the user and (b) a department count for items previously purchased by the user with or after the anchor item, comprising:
determining a respective department for each of a predetermined number of items previously purchased by the user after the user purchased an item in an anchor department of the anchor item; and
determining, in real-time, a count of different departments among the respective departments for the predetermined number of items, wherein:
determining, in real-time, the diversity preference score further comprises determining, in real-time, the diversity preference score based further at least in part on the count of different departments;
determining, in real-time, a comparison result between the diversity preference score and a diversity preference threshold;
generating, in real-time, a personalized recommendation pool based on (a) the comparison result, (b) a complementary recommendation pool generated by the embedding-based machine learning module based at least in part on the anchor item, and (c) a diversity objective function, wherein:
generating the personalized recommendation pool comprises re-ranking recommended items of the complementary recommendation pool based on the diversity objective function and, when the diversity preference score is greater than the diversity preference threshold, the re-ranking includes adding a recommended item one at a time based on a fast greedy maximum a posteriori (MAP) approach and a cross-domain diversity objective function;
the recommended items of the complementary recommendation pool are ranked according to a respective personalized complementary score for each of the recommended items of the complementary recommendation pool;
when the comparison result indicates that the diversity preference score is greater than the diversity preference threshold, the diversity objective function is associated with cross-department diversity for increasing a recommended-item-department count for the personalized recommendation pool; and
when the comparison result indicates that the diversity preference score is not greater than the diversity preference threshold, the diversity objective function is associated with within-department diversity for increasing an anchor-department-item count for the personalized recommendation pool associated with the anchor department of the anchor item; and
transmitting, in real-time, the personalized recommendation pool to be displayed with the anchor item on the user interface.

2. The system in claim 1, wherein the computing instructions, when run on the one or more processors, further cause the one or more processors to perform:

reducing a size of the complementary recommendation pool based on a predetermined size limit.

3. The system in claim 1, wherein:
generating the personalized recommendation pool further comprises:
adding a recommended item from the recommended items of the complementary recommendation pool to the personalized recommendation pool iteratively based at least in part on a determinantal point process (DPP) with fast greedy maximum a posteriori (MAP) inference.

4. The system in claim 1, wherein the diversity preference threshold is set by the embedding-based machine learning module, as trained.

5. The system in claim 2, wherein the predetermined size limit is determined based on a type of user interface for displaying the personalized recommendation pool.

6. The system in claim 3, wherein:
adding the recommended item from the recommended items of the complementary recommendation pool to the personalized recommendation pool iteratively further comprises
determining a respective diversity score for each of one or more remaining items of the recommended items of the complementary recommendation pool.

7. The system in claim 6, wherein:
when the diversity objective function is associated with the cross-department diversity, the respective diversity score for each of the one or more remaining items of the recommended items of the complementary recommendation pool is calculated based in part on: (a) a respective personalized complementary score for the each of the one or more remaining items; and (b) a diversification increment by the each of the one or more remaining items; and
when the diversity objective function is associated with the within-department diversity, the respective diversity score for each of the one or more remaining items of the recommended items of the complementary recommendation pool is calculated based in part on: (a) the respective personalized complementary score for the each of the one or more remaining items; and (b) a similarity increment by the each of the one or more remaining items.

8. The system in claim 6, wherein:
when the diversity objective function is associated with the cross-department diversity, the respective diversity score for the each of the one or more remaining items is calculated by:

$$(\alpha S_{q,r} + (1-\alpha)(\log(\det(L_{R_d + [r]})) - \log(\det(L_{R_d}))))],$$
wherein $S_{q,r}$: a respective personalized complementary score between the anchor item (q) and the each of the one or more remaining items (r) for the user, $$S_{q,r} = \frac{1 + \int_q^T g_r}{2},$$

and $f_q^T$ and $g_r$ is a product score for normalized item embeddings between q and r;
$\alpha$: a predetermined constant, $0 \le \alpha < 1$;
$\det(L_R)$: a determinant of a kernel matrix L indexed by member items of an item pool (R), R comprising a subset of the complementary recommendation pool; and
$L_R$: an item-to-item similarity matrix for the member items in the item pool $$(R), L_R = \frac{1 + H^T H}{2}, H \equiv \{g_r \mid r \in R\}.$$

9. The system in claim 6, wherein:
when the diversity objective function is associated with the within-department diversity, the respective diversity score for the each of the one or more remaining items is calculated by:

$$(\beta S_{q,r} + (1-\beta)(\log(\det(L'_{R_s + [r]})) - \log(\det(L'_{R_s}))))],$$
wherein:

$S_{q,r}$: a respective personalized complementary score between the anchor item (g) and the each of the one or more remaining items (r) for the user, $$S_{q,r} = \frac{1 + \int_q^T g_r}{2},$$

and $f_q^T$ and $g_r$ is a product score for normalized item embeddings between q and r;
$\beta$: a predetermined constant, $0 \le "\beta" < 1$;
$\det(L'_R)$: a determinant of a kernel matrix L'indexed by member items of an item pool (R), R comprising a subset of the complementary recommendation pool and extra complementary items; and
$L'_R$: an item-to-item dissimilarity matrix for the member items in the item pool (R), L'=1+diag(L)–L, and $$L_R = \frac{1 + H^T H}{2},$$

$H \equiv \{g_r \mid r \in R\}$.

10. The system in claim 6, wherein:
adding the recommended item from the recommended items of the complementary recommendation pool to the personalized recommendation pool iteratively further comprises adding the recommended item of the one or more remaining items to the personalized recommendation pool when the recommended item is associated with a maximal respective diversity score of the respective diversity score for each of the one or more remaining items.

11. A method being implemented via execution of computing instructions configured to run at one or more processors and stored at one or more non-transitory computer-readable media, the method comprising:
training iteratively an embedding-based machine learning module to generate a recommendation pool for a reference item, comprising:
converting each item attribute of item attributes into a respective predefined data format of one or more predefined attribute formats;

generating item embeddings based on the item attributes, as converted, for training items;
generating customer embeddings based on customer behavior data for customers;
training the embedding-based machine learning module to determine customer item preference coefficients based on the item embeddings and the customer embeddings;
training the embedding-based machine learning module to determine a respective likelihood of co-purchase between a first item and a second item of the training items for each customer of the customers based on the customer item preference coefficients; and
re-training the embedding-based machine learning module based at least in part on historic behavior of the embedding-based machine learning module;
determining, in real-time, a diversity preference score for a user based at least in part on:
(a) an anchor item chosen by the user via a user interface executed on a user device of the user and (b) a department count for items previously purchased by the user with or after the anchor item, comprising:
determining a respective department for each of a predetermined number of items previously purchased by the user after the user purchased an item in an anchor department of the anchor item; and
determining, in real-time, a count of different departments among the respective departments for the predetermined number of items, wherein:
determining, in real-time, the diversity preference score further comprises determining, in real-time, the diversity preference score based further at least in part on the count of different departments;
determining, in real-time, a comparison result between the diversity preference score and a diversity preference threshold;
generating, in real-time, a personalized recommendation pool based on (a) the comparison result, (b) a complementary recommendation pool generated by the embedding-based machine learning module based at least in part on the anchor item, and (c) a diversity objective function, wherein:
generating the personalized recommendation pool comprises re-ranking recommended items of the complementary recommendation pool based on the diversity objective function and, when the diversity preference score is greater than the diversity preference threshold, the re-ranking includes adding a recommended item one at a time based on a fast greedy maximum a posteriori (MAP) approach and a cross-domain diversity objective function;
the recommended items of the complementary recommendation pool are ranked according to a respective personalized complementary score for each of the recommended items of the complementary recommendation pool;
when the comparison result indicates that the diversity preference score is greater than the diversity preference threshold, the diversity objective function is associated with cross-department diversity for increasing a recommended-item-department count for the personalized recommendation pool; and
when the comparison result indicates that the diversity preference score is not greater than the diversity preference threshold, the diversity objective function is associated with within-department diversity for increasing an anchor-department-item count for the personalized recommendation pool associated with the anchor department of the anchor item; and
transmitting, in real-time, the personalized recommendation pool to be displayed with the anchor item on the user interface.

12. The method in claim 11 further comprising:
reducing a size of the complementary recommendation pool based on a predetermined size limit.

13. The method in claim 11, wherein:
generating the personalized recommendation pool further comprises:
adding a recommended item from the recommended items of the complementary recommendation pool to the personalized recommendation pool iteratively based at least in part on a determinantal point process (DPP) with fast greedy maximum a posteriori (MAP) inference.

14. The method in claim 11, wherein the diversity preference threshold is set by the embedding-based machine learning module, as trained.

15. The method in claim 12, wherein the predetermined size limit is determined based on a type of user interface for displaying the personalized recommendation pool.

16. The method in claim 13, wherein:
adding the recommended item of the recommended items of the complementary recommendation pool to the personalized recommendation pool iteratively further comprises:
determining a respective diversity score for each of one or more remaining items of the recommended items of the complementary recommendation pool; and
adding the recommended item of the one or more remaining items to the personalized recommendation pool when the recommended item is associated with a maximal respective diversity score of the respective diversity score for each of the one or more remaining items.

17. The method in claim 16, wherein:
when the diversity objective function is associated with the cross-department diversity, the respective diversity score for each of the one or more remaining items of the recommended items of the complementary recommendation pool is calculated based in part on: (a) a respective personalized complementary score for the each of the one or more remaining items; and (b) a diversification increment by the each of the one or more remaining items; and
when the diversity objective function is associated with the within-department diversity, the respective diversity score for each of the one or more remaining items of the recommended items of the complementary recommendation pool is calculated based in part on: (a) the respective personalized complementary score for the each of the one or more remaining items; and (b) a similarity increment by the each of the one or more remaining items.

18. The method in claim 16, wherein:
when the diversity objective function is associated with the cross-department diversity, the respective diversity score for the each of the one or more remaining items is calculated by:

$$(\alpha S_{q,r} + (1-\alpha)(\log(\det(L_{R_d + [r]})) - \log(\det(L_{R_d})))],$$

wherein:

$S_{q,r}$: a respective personalized complementary score between the anchor item (q) and the each of the one or more remaining items (r) for the user, $$S_{q,r} = \frac{1 + \int_q^T g_r}{2},$$

and $f_q^T$ and $g_r$ is a product score for normalized item embeddings between q and r;

α: a predetermined constant, 0≤α<1;

$det(L_R)$: a determinant of a kernel matrix L indexed by member items of an item pool (R), R comprising a subset of the complementary recommendation pool; and $L_R$: an item-to-item similarity matrix for the member items in the item pool $$(R), L_R = \frac{1 + H^T H}{2},$$

H≡{$g_r$|r∈R}.

19. The method in claim 16, wherein:

when the diversity objective function is associated with the within-department diversity, the respective diversity score for the each of the one or more remaining items is calculated by:

(β$S_{q,r}$+(1−β)(log(det($L'_{R_s+[r]}$))−log(det($L'_{R_s}$)))],
wherein:

$S_{q,r}$: a respective personalized complementary score between the anchor item (q) and the each of the one or more remaining items (r) for the user, $$S_{q,r} = \frac{1 + \int_q^T g_r}{2},$$

and $f_q^T$ and $g_r$ is a product score for normalized item embeddings between q and r;

β: a predetermined constant, 0≤"β"<1;

$det(L'_R)$: a determinant of a kernel matrix L'indexed by member items of an item pool (R),f R comprising a subset of the complementary recommendation pool and extra complementary items; and $L'_R$: an item-to-item dissimilarity matrix for the member items in the item pool (R), L'=1+diag(L)−L, and $$L_R = \frac{1 + H^T H}{2},$$

≡{$g_r$|r∈R}.

20. A non-transitory computer readable storage medium storing one or more computing instructions that, when run on one or more processors, cause the one or more processors to perform operations comprising:

training iteratively an embedding-based machine learning module to generate a recommendation pool for a reference item, comprising:

converting each item attribute of item attributes into a respective predefined data format of one or more predefined attribute formats;

generating item embeddings based on the item attributes, as converted, for training items;

generating customer embeddings based on customer behavior data for customers;

training the embedding-based machine learning module to determine customer item preference coefficients based on the item embeddings and the customer embeddings;

training the embedding-based machine learning module to determine a respective likelihood of co-purchase between a first item and a second item of the training items for each customer of the customers based on the customer item preference coefficients; and re-training the embedding-based machine learning module based at least in part on historic behavior of the embedding-based machine learning module;

determining, in real-time, a diversity preference score for a user based at least in part on:

(a) an anchor item chosen by the user via a user interface executed on a user device of the user and (b) a department count for items previously purchased by the user with or after the anchor item, comprising:

determining a respective department for each of a predetermined number of items previously purchased by the user after the user purchased an item in an anchor department of the anchor item; and determining, in real-time, a count of different departments among the respective departments for the predetermined number of items, wherein:

determining, in real-time, the diversity preference score further comprises determining, in real-time, the diversity preference score based further at least in part on the count of different departments;

determining, in real-time, a comparison result between the diversity preference score and a diversity preference threshold;

generating, in real-time, a personalized recommendation pool based on (a) the comparison result, (b) a complementary recommendation pool generated by the embedding-based machine learning module based at least in part on the anchor item, and (c) a diversity objective function, wherein:

generating the personalized recommendation pool comprises:

generating the personalized recommendation pool comprises re-ranking recommended items of the complementary recommendation pool based on the diversity objective function and, when the diversity preference score is greater than the diversity preference threshold, the re-ranking includes adding a recommended item one at a time based on a fast greedy maximum a posteriori (MAP) approach and a cross-domain diversity objective function;

the recommended items of the complementary recommendation pool are ranked according to a respective personalized complementary score for each of the recommended items of the complementary recommendation pool;

when the comparison result indicates that the diversity preference score is greater than the diversity preference threshold, the diversity objective function is associated with cross-department diversity for increasing a recommended-item-department count for the personalized recommendation pool; and when the comparison result indicates that the diversity preference score is not greater than the diversity preference threshold, the diversity objective function is associated with within-department diversity for increasing an anchor-department-item count for the personalized recommendation pool associated with the anchor department of the anchor item; and transmitting, in real-time, the personalized recommendation pool to be displayed with the anchor item on the user interface.

* * * * *